United States Patent [19]

Cantabloube et al.

[11] Patent Number: 5,260,829
[45] Date of Patent: Nov. 9, 1993

[54] OPTICAL MIXER WITHOUT DISTURBANCE OF OPTICAL PATHS, NOTABLY FOR HELMET VISUAL DISPLAY SYSTEM

[75] Inventors: Christian Cantabloube, St Medard En Jalles; Jean-Pierre Gerbe, Pessac, both of France

[73] Assignee: Sextant Avionique, Meudon La Foret, France

[21] Appl. No.: 868,886

[22] Filed: Apr. 16, 1992

[30] Foreign Application Priority Data

Apr. 19, 1991 [FR] France .................. 91 04859

[51] Int. Cl.⁵ .................. G02B 27/10; G02B 26/08
[52] U.S. Cl. .................. 359/630; 359/632; 359/634; 359/637
[58] Field of Search ........... 359/630, 632, 634, 637, 359/583, 589, 710, 665; 385/18, 25

[56] References Cited

U.S. PATENT DOCUMENTS

| | | |
|---|---|---|
| 3,389,950 | 6/1968 | Harper . |
| 4,563,058 | 1/1986 | Yardy .................. 359/583 |
| 4,669,817 | 6/1987 | Mori .................. 385/25 |
| 4,682,844 | 7/1987 | Mori .................. 385/25 |
| 4,705,349 | 11/1987 | Reedy .................. 385/18 |

FOREIGN PATENT DOCUMENTS

| | | |
|---|---|---|
| 0201306 | 12/1986 | European Pat. Off. . |
| 0206324 | 12/1986 | European Pat. Off. . |
| 2939136 | 4/1981 | Fed. Rep. of Germany . |
| 2665267 | 1/1992 | France . |

Primary Examiner—Jon W. Henry
Attorney, Agent, or Firm—Oblon, Spivak, McClelland, Maier & Neustadt

[57] ABSTRACT

The disclosed mixer comprises a rotating optical block with a symmetry of revolution. This block is axially sectioned into two, and one face of one of the half blocks has a semi-reflective coating. This block cooperates with a source, the images of which have to be always transmitted and with a source, the images of which have to be transmitted only in one case of use.

4 Claims, 1 Drawing Sheet

OPTICAL MIXER WITHOUT DISTURBANCE OF OPTICAL PATHS, NOTABLY FOR HELMET VISUAL DISPLAY SYSTEM

BACKGROUND OF THE INVENTION

1. Field of the Invention

The present invention relates to an optical mixer without disturbance of optical paths, notably for helmet visual display systems.

2. Description of the Prior Art

Helmet display systems are generally used in military aircraft or helicopters. Among the different types of display systems of this type, there are those fitted out with two image sources: a cathode-ray tube and a light intensifier tube (for night vision). The cathode-ray tube is used by day and by night to present a synthetic image (comprising piloting, navigation and firing information). The image intensifier tube is used only by night to enable a night vision of the outside scene without illumination. The images from the two sources are presented to the pilot's eyes by means of an optical collimation system common to both channels. This calls for a mixer in the optical path in order to enable the superimposition of the images of these two sources. This mixer is generally a semi-reflective mirror.

To work properly, this display system must meet the following constraints as regards the proportions of light reflected and light transmitted by the mixer. The light intensifier tube gives a luminance of some $Cd/m^2$. The luminance of the image given by the light intensifier and considered at the pilot's eyes should also be equal to some $Cd/m^2$. The latter luminance is directly related to the coefficient of refection of the mixer. This coefficient should therefore be the maximum. The cathode-ray tube may give a luminance of several thousands of $Cd/m^2$. By night, the image of this cathode-ray tube should have a luminance of some $Cd/m^2$. The coefficient of transmission of the mixer may therefore be very low in this case. Thus, by night, the typical characteristics of the mixer are: reflection : 90% for the light intensifier, and transmission: 10% for the cathode-ray tube. By day, the image of the cathode-ray tube should have a luminance of 1000 to 2000 $Cd/m^2$ to be visible on a very bright background. Consequently, the mixer defined for the night is no longer suited to daytime use for it excessively attenuates the light of the cathode-ray tube.

Because the spectral bands of the images emitted by the cathode-ray tubes are very close to those of the images emitted by the light intensifier tubes, it is not possible to resort to standard selective mixers, which are not sufficiently selective.

One approach would consist in removing the mixer during daytime use since the light intensifier channel is then not used by day. The space taken up by the standard moving mechanisms and weights are non-negligible and incompatible with helmet visual display systems. Furthermore, the elimination of the mixer from the optical path would lead to a variation of the optical path. This would change the position of the images presented to the user and make it necessary to carry out an adjustment of this optical path or would lead to a lowering of the quality of the image.

Furthermore, since the mixer is made of a material having a refraction index different from 1, it has an undesirable optical influence: a transversal shift of the image, difference in focusing and other optical aberrations.

It is possible to consider replacing the mixer by an element made of glass (or of another optical material) with the same dimensions, without any coating for daytime use, in order to transmit the image of the cathode-ray tube without any attenuation and without contributing any optical faults. However, the implementation of such an approach would, in most cases, be complicated and lengthy and would require mechanisms that are bulky and difficult to control.

SUMMARY OF THE INVENTION

An object of the invention is a mixer for a helmet display system of the above-mentioned type that is simple, costs little to make and is compact, enables a practically perfect superimposition of the images from the two image sources in night-time use, introduces no optical aberrations or disturbances and contributes practically no attenuation in transmission during night-time use.

The mixer according to the invention comprises a rotating optical block with a symmetry in relation to an axis of revolution, capable of rotating about this axis of symmetry, this block being sectioned along a plane passing through said axis, one of the planes of the half-blocks, determined by the sectioning plane of the block, bearing a semi-reflective coating.

BRIEF DESCRIPTION OF THE DRAWING

The invention shall be understood more clearly from the following detailed description of an embodiment, taken as a non-restrictive example and illustrated by the appended drawing, the single figure of which shows a schematic top view of a mixer according to the invention.

DESCRIPTION OF A PREFERRED EMBODIMENT

Figure 1:
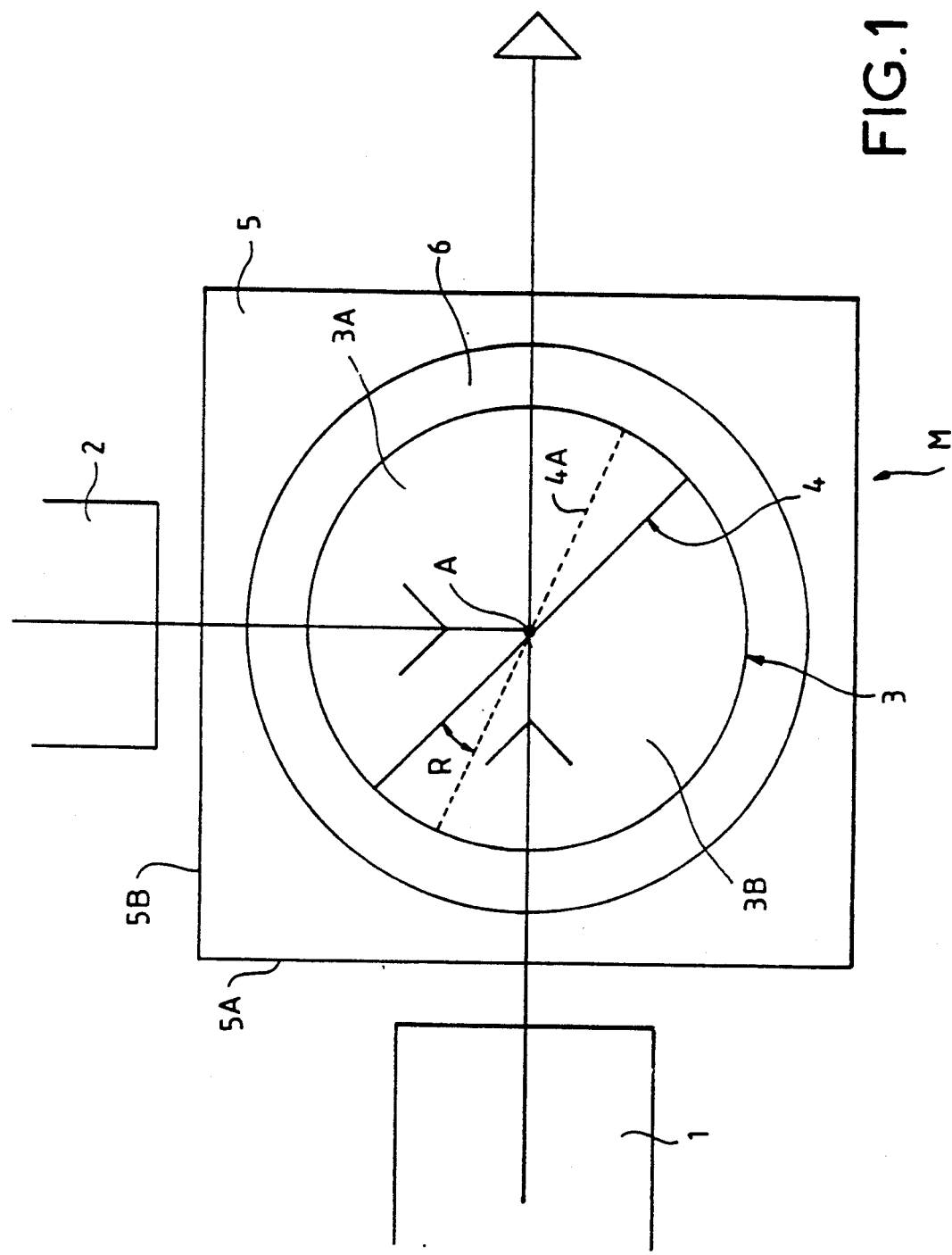

The mixer M permanently transmits the images from a source 1 (for example a cathode-ray tube). These images should be attenuated for a first state of the mixer M and should be non-attenuated for a second state of the mixer.

Furthermore, the mixer M cooperates with a second image source 2 (for example a light intensifier). Typically, the beams of the sources 1 and 2 are perpendicular to each other. For a first state of the mixer M, the images of the source 2 should be superimposed on those of the source 1 and should be practically non-attenuated. For a second state of the mixer 2, the images produced by the source 2, if any, should not be superimposed on those of the source 1, for the latter should be transmitted practically without attenuation.

The mixer M essentially comprises an optical block 3 with symmetry of revolution about an axis A. The block 3 is made of glass or of another material with similar properties. The axis A is positioned perpendicularly to the plane formed by the beams coming from the sources 1 and 2, and goes through the meeting point of these two beams. In the embodiment shown, the block 3 is cylindrical, but could have another shape generated by revolution.

The block 3 is actually made of two semi-cylindrical parts 3A and 3B, formed for example by the sawing of a cylinder along a plane (the trace 4 which can be seen in the drawing) going through its axis of symmetry. The plane face of one of the half-blocks 3A or 3B has a semi-reflective coating. This coating should be frequentially selective. It is advantageously dichroic or holographic. After the deposition of this coating, the two half-blocks 3A, 3B are bonded together to form the block 3. A coating such is this is angularly selective: i.e. it is reflective for a certain critical incidence and is not reflective for an incidence that is different from the critical incidence by at least 20°.

In the drawing, a solid line shows the trace 4 of the plane of the semi-reflective coating when the block 3 is in the position for which it reflects the beam of the source 2 and transmits the beam of the source 1 with attenuation of transmission (a typical attenuation of about 10%). A line of dashes shows the trace 4A of the semi-reflective plane when the block 3 is in the position for which this coating practically does not reflect the beam of the source 2 and transmits the beam of the source 1 almost entirely. The angle R between the traces 4 and 4A is typically from 10° to 20°.

Since the block 3 has a symmetry of revolution, the angle of incidence of the beams of the sources 1 and 2 on the external face of this block does not vary during the rotation of the block. Furthermore, the rotation of the block 3 about its axis of symmetry causes no modification of the paths of these beams, hence causes neither any shifting of the image downline from the mixer nor any other deformation of this image.

Advantageously, the block 3 can be enclosed in a block 5, the internal shape of which is complementary to that of the block 3. This block 5, made of a material with the same refraction index as that of the block 3, has plane external faces, parallel two by two and parallel to the axis A.

The plane faces 5A, 5B of the block 5 facing the sources 1 and 2 are perpendicular to the beams of these sources. Thus, this block 5 can be used to attenuate the optical power of the block 3 and make the assembly 3-5 equivalent to a fixed optical block with plane and parallel faces. Naturally, the clearance between the blocks 3 and 5 should be minimal.

According to one variant, enabling an improvement of the optical neutrality of the mixer of the invention, a fluid having the index closest to that of the blocks 3 and 5 is placed in the volume 6 between the blocks 3 and 5.

In this case, it is possible for the clearance between the blocks 3 and 5 to be not minimal.

What is claimed is:

1. An optical mixer for use in a helmet visual display system, comprising:
   a first receiving portion for receiving a first image;
   a second receiving portion for receiving a second image;
   a transmitting portion for transmitting at least one of the first image and both the first and second image;
   a rotating optical block being rotatable about an axis of revolution, said rotating optical block comprising two half blocks which are symmetrical about a plane passing through said axis, one of said half blocks having a semi-reflective coating along a surface parallel and proximate to said plane;
   wherein said rotating optical block always allows said first image to pass from said first receiving portion through said rotating optical block to said transmitting portion; and
   wherein said rotating optical block selectively allows said second image to pass from said second receiving portion to said semi-reflective coating and is selectively reflected off of said reflective coating, depending on a rotational angle of said rotating optical block.

2. An optical mixer according to claim 1, wherein said rotating optical block has a cylindrical shape.

3. An optical mixer according to claim 1, wherein said rotating optical block is enclosed in a second optical block having a shape which is complementary to a shape of said rotating optical block, said second optical block having two plane external faces which respectively correspond to said first receiving portion and said second receiving portion, said first plane face being perpendicular to a beam corresponding to the first received image and said second plane face being perpendicular to a beam of the second image.

4. An optical mixer according to claim 3, wherein a space between said two blocks is filled with a fluid having an index of refraction which is approximately equal to an index of refraction of said two optical blocks.

* * * * *